United States Patent
Chae et al.

(10) Patent No.: US 10,652,909 B2
(45) Date of Patent: May 12, 2020

(54) METHOD AND DEVICE FOR TRANSMITTING DATA AND CONTROL INFORMATION OF TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/068,356

(22) PCT Filed: Jan. 5, 2017

(86) PCT No.: PCT/KR2017/000142
§ 371 (c)(1),
(2) Date: Jul. 5, 2018

(87) PCT Pub. No.: WO2017/119740
PCT Pub. Date: Jul. 13, 2017

(65) Prior Publication Data
US 2019/0029028 A1    Jan. 24, 2019

Related U.S. Application Data

(60) Provisional application No. 62/275,226, filed on Jan. 5, 2016, provisional application No. 62/335,668, filed
(Continued)

(51) Int. Cl.
*H04W 72/12* (2009.01)
*H04W 72/04* (2009.01)

(52) U.S. Cl.
CPC ....... *H04W 72/12* (2013.01); *H04W 72/0446* (2013.01); *H04W 72/1278* (2013.01)

(58) Field of Classification Search
CPC .............. H04W 72/12; H04W 72/044; H04W 72/0446; H04W 72/1278; H04W 72/1284;
(Continued)

(56) References Cited

U.S. PATENT DOCUMENTS

2015/0327288 A1* 11/2015 Park .................... H04L 1/08
370/329
2016/0021625 A1* 1/2016 Li ..................... H04W 72/1289
370/336
(Continued)

FOREIGN PATENT DOCUMENTS

EP          3373641        9/2018
WO       2015065014       5/2015
(Continued)

OTHER PUBLICATIONS

PCT International Application No. PCT/KR2017/000142, Written Opinion of the International Searching Authority dated Apr. 25, 2017, 20 pages.
(Continued)

*Primary Examiner* — Kevin D Mew
(74) *Attorney, Agent, or Firm* — Lee, Hong, Degerman, Kang & Waimey

(57) ABSTRACT

An embodiment of the present invention provides a method for transmitting data and control information by a terminal in a wireless communication system, the method comprising the steps of: determining subframes in which a scheduling assignment (SA) is to be transmitted in an SA resource pool; and transmitting data by means of resources indicated by a combination of a time resource indication field and information related to the determined subframes.

8 Claims, 11 Drawing Sheets

Related U.S. Application Data on May 12, 2016, provisional application No. 62/339,741, filed on May 20, 2016, provisional application No. 62/378,212, filed on Aug. 22, 2016.

(58) Field of Classification Search
CPC .. H04W 74/00; H04W 74/002; H04W 74/004
See application file for complete search history.

(56) References Cited

U.S. PATENT DOCUMENTS

| | | | | |
|---|---|---|---|---|
| 2016/0044619 A1* | 2/2016 | Ryu | | H04W 76/14 370/350 |
| 2016/0044665 A1* | 2/2016 | Novlan | | H04W 76/14 370/336 |
| 2016/0044668 A1* | 2/2016 | Yoon | | H04L 5/14 370/280 |
| 2016/0249355 A1* | 8/2016 | Chae | | H04W 72/1263 |
| 2017/0127413 A1* | 5/2017 | Guan | | H04W 72/0446 |
| 2017/0150501 A1* | 5/2017 | Park | | H04L 1/1861 |
| 2018/0132136 A1* | 5/2018 | Lu | | H04W 28/065 |
| 2018/0359749 A1* | 12/2018 | Liu | | H04W 8/005 |
| 2019/0116565 A1* | 4/2019 | Chae | | H04W 24/10 |

FOREIGN PATENT DOCUMENTS

| | | |
|---|---|---|
| WO | 2015152580 | 10/2015 |
| WO | 2015156605 | 10/2015 |

OTHER PUBLICATIONS

ZTE, "Resource pool allocation enhancement for V2V", 3GPP TSG RAN WG1 Meeting #83, R1-156658, Nov. 2015, 7 pages.

LG Electronics, "Discussion on resource pool structure and control signaling for PC5-based V2V", 3GPP TSG RAN WG1 Meeting #83, R1-156892, Nov. 2015, 6 pages.

Intel, "On enhancements to resource pool configuration for V2V communication", 3GPP TSG Ran WG1 Meeting #83, R1-156690, Nov. 2015, 9 pages.

European Patent Office Application Serial No. 17736112.8, Search Report dated Jun. 5, 2019, 10 pages.

* cited by examiner

FIG. 5
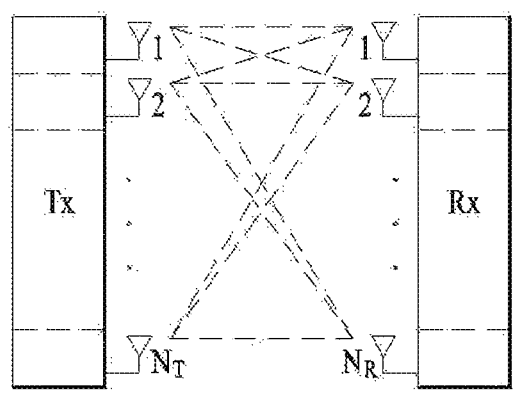
(a)
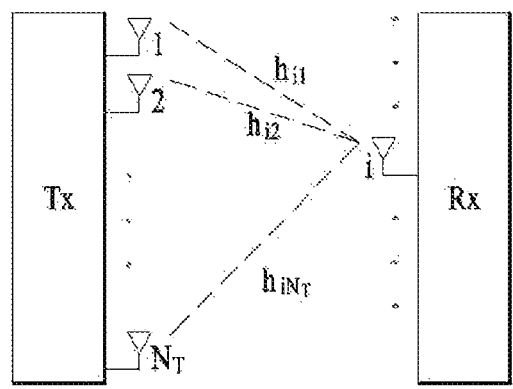
(b)

FIG. 8
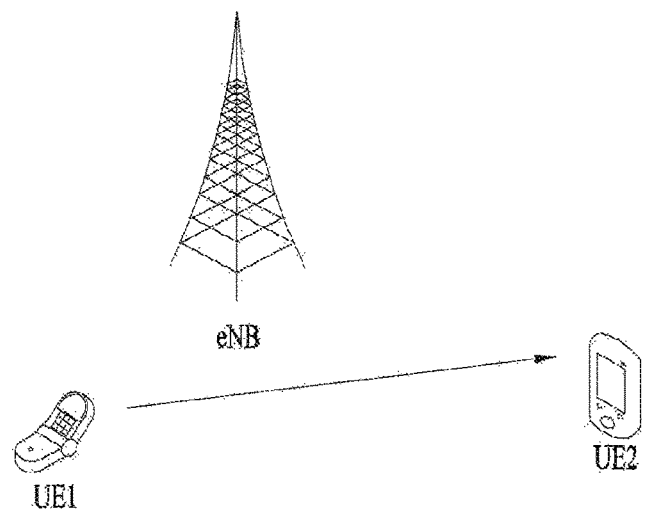
(a)
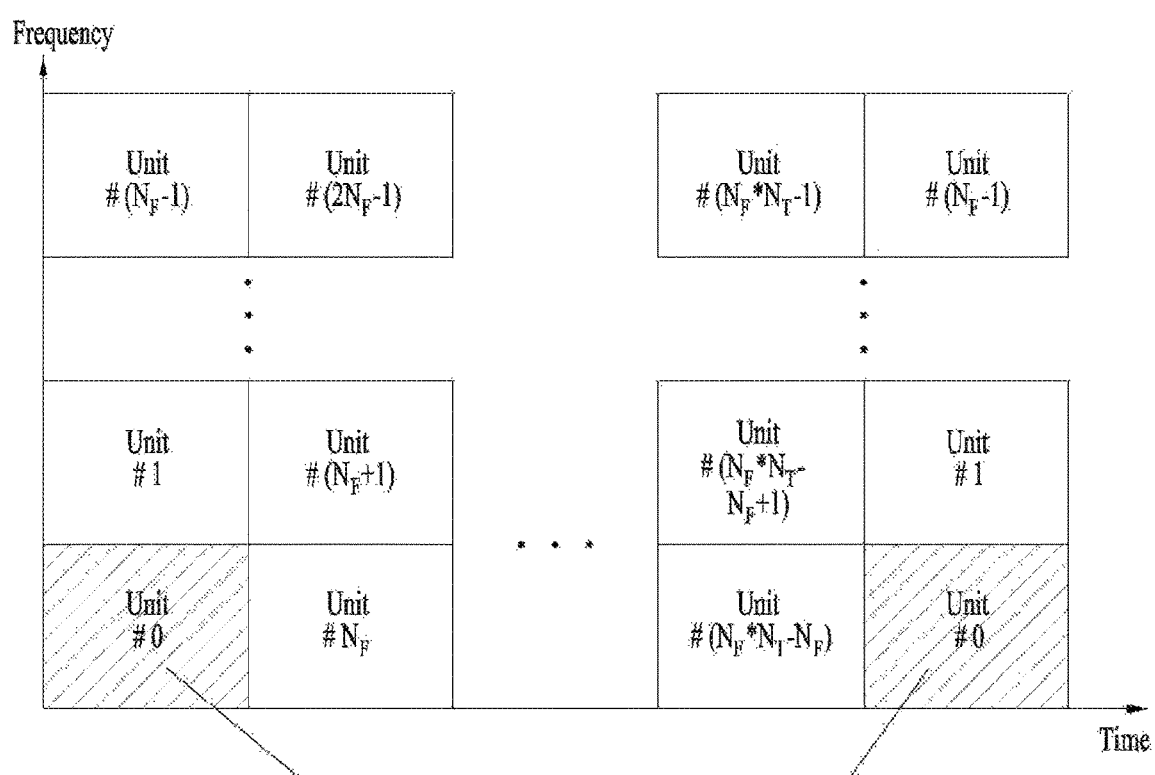
(b)

METHOD AND DEVICE FOR TRANSMITTING DATA AND CONTROL INFORMATION OF TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2017/000142, filed on Jan. 5, 2017, which claims the benefit of U.S. Provisional Application Nos. 62/275,226, filed on Jan. 5, 2016, 62/335,668, filed on May 12, 2016, 62/339,741, filed on May 20, 2016, and 62/378,212, filed on Aug. 22, 2016, the contents of which are all hereby incorporated by reference herein in their entirety.

TECHNICAL FIELD

Following description relates to a wireless communication system, and more particularly, to a method for a UE to transmit control information and data having a correlation and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly without an evolved Node B (eNB). D2D communication may cover UE-to-UE communication and peer-to-peer communication. In addition, D2D communication may be applied to Machine-to-Machine (M2M) communication and Machine Type Communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

Currently, discussion on V2X communication associated with D2D communication is in progress. The V2X communication corresponds to a concept including V2V communication performed between vehicle UEs, V2P communication performed between a vehicle and a UE of a different type, and V2I communication performed between a vehicle and an RSU (roadside unit).

DISCLOSURE OF THE INVENTION

Technical Task

A technical task of the present invention is to provide a method of transmitting control information and data having a correlation.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting control information and data, which are transmitted by a user equipment (UE) in a wireless communication system, include the steps of determining subframes in which SA (scheduling assignment) is to be transmitted in an SA resource pool, and transmitting data via a resource indicated by a combination of information on the determined subframes and a time resource indication field.

To further achieve these and other advantages and in accordance with the purpose of the present invention, according to a different embodiment, a user equipment transmitting control information and data in a wireless communication system includes a transmitter and a receiver, and a processor, the processor configured to determine subframes in which SA is to be transmitted in an SA resource pool, the processor configured to control the transmitter to transmit data via a resource indicated by a combination of information on the determined subframes and a time resource indication field via the transmitter.

The time resource indication field may correspond to a T-RPT (time resource pattern for transmission) field.

The information on the subframes may correspond to a position in the SA resource pool of one or more subframes among the subframes.

Positions of the one or more subframes among the subframes can indicate information corresponding to the first n bits of the T-RPT field.

The n can be determined by a size of the SA resource pool and a position of the first subframe among the subframes.

The n can be determined by a size of the SA resource pool and positions of a first subframe and a second subframe among the subframes.

The first n bits of the T-RPT field can indicate whether or not the data is transmitted.

The first n bits of the T-RPT field can be used for a virtual CRC (cyclic redundancy check).

The information on the subframes may correspond to an index in the SA resource pool of one or more subframes among the subframes.

Indexes of one or more subframes among the subframes can indicate information corresponding to the first n bits of the T-RPT field.

The n can be determined by the number of subframe indexes in the SA resource pool and a position of the first subframe among the subframes.

The resource indicated by the combination of the information on the determined subframes and the time resource indication field can be randomly selected from among subframes except the SA resource pool in an SA period.

Advantageous Effects

According to the present invention, it is able to increase a reception rate between UEs and solve a problem caused by a half-duplex constraint.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

FIG. 8 is a diagram for an example of a D2D resource pool for D2D communication;

BEST MODE

Mode for Invention

Figure 1:
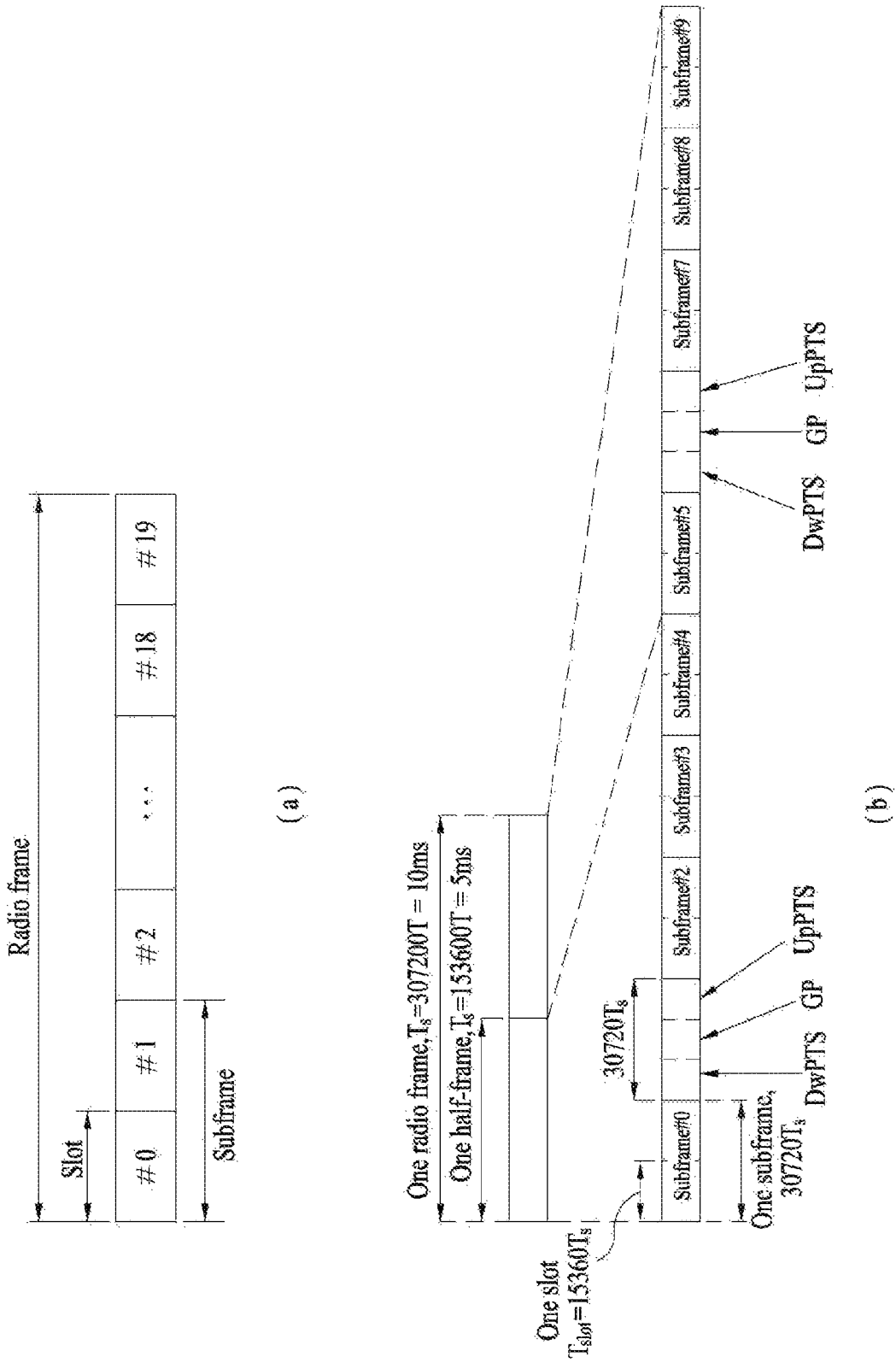
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS.

The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs 01-DMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
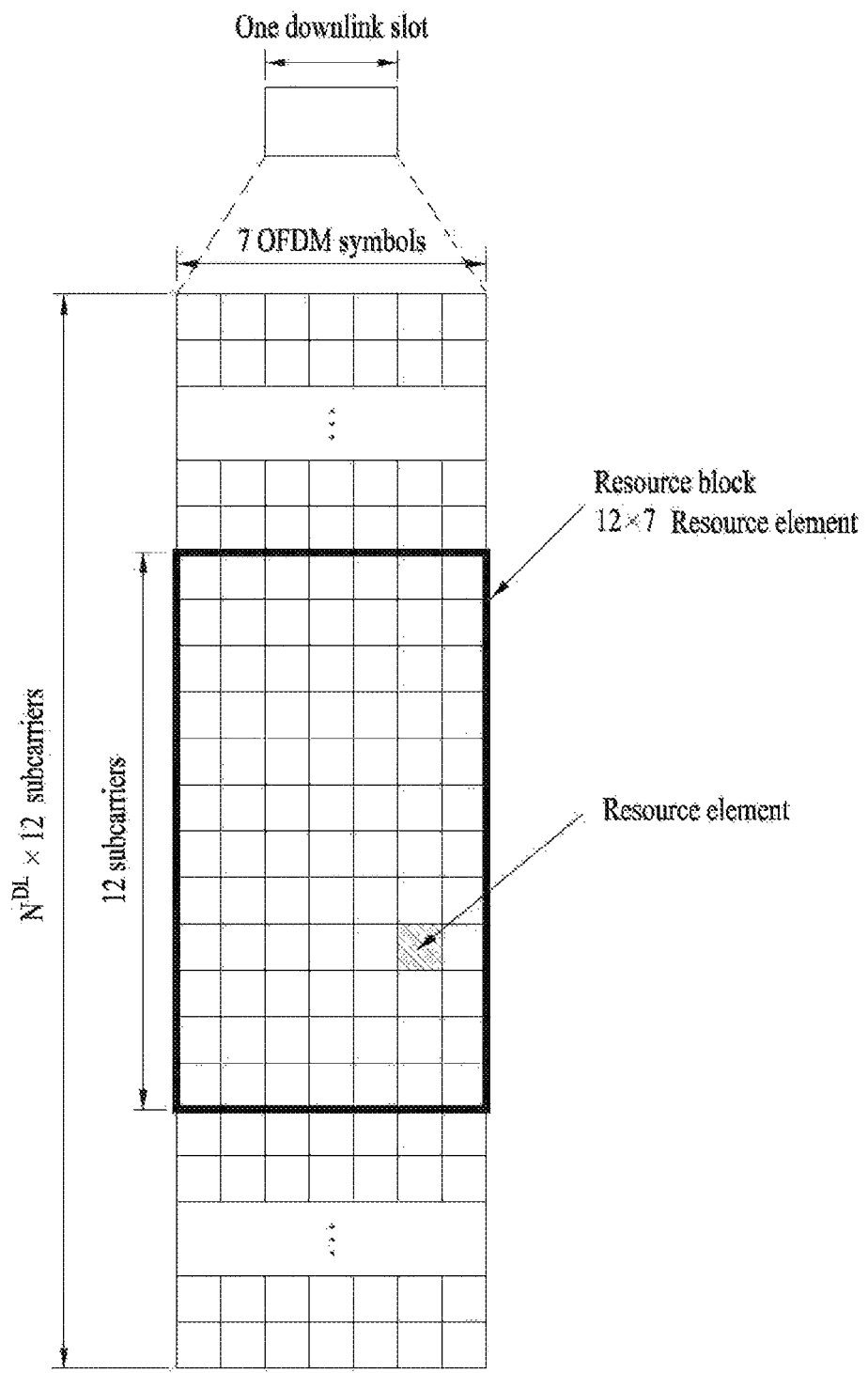
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
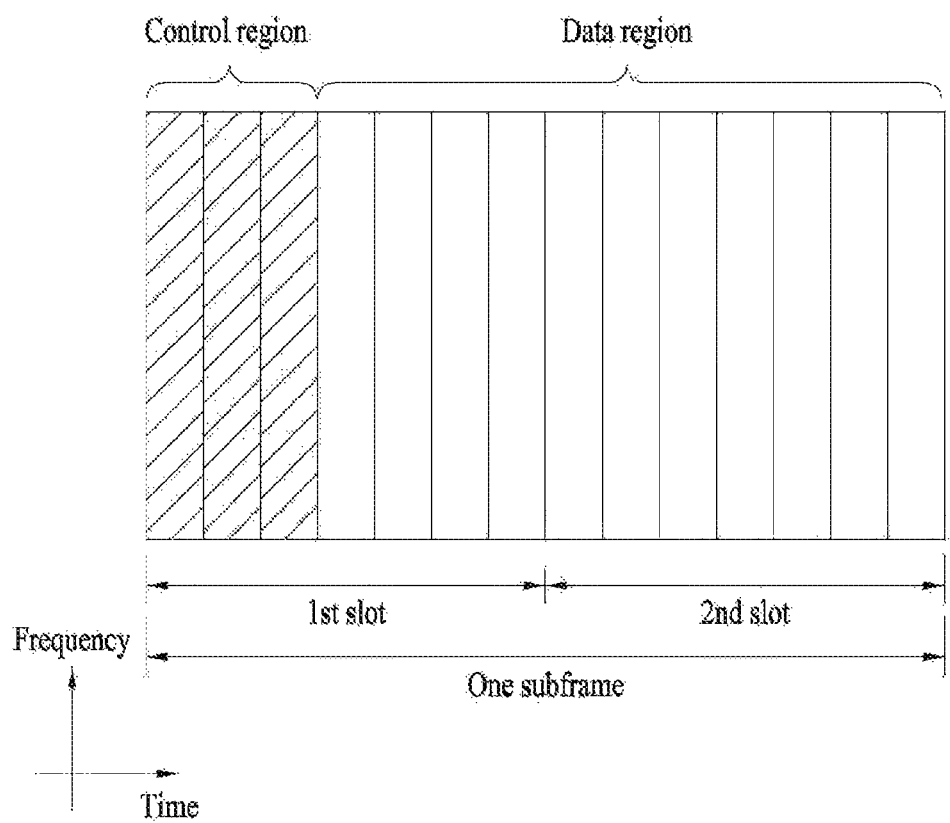
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
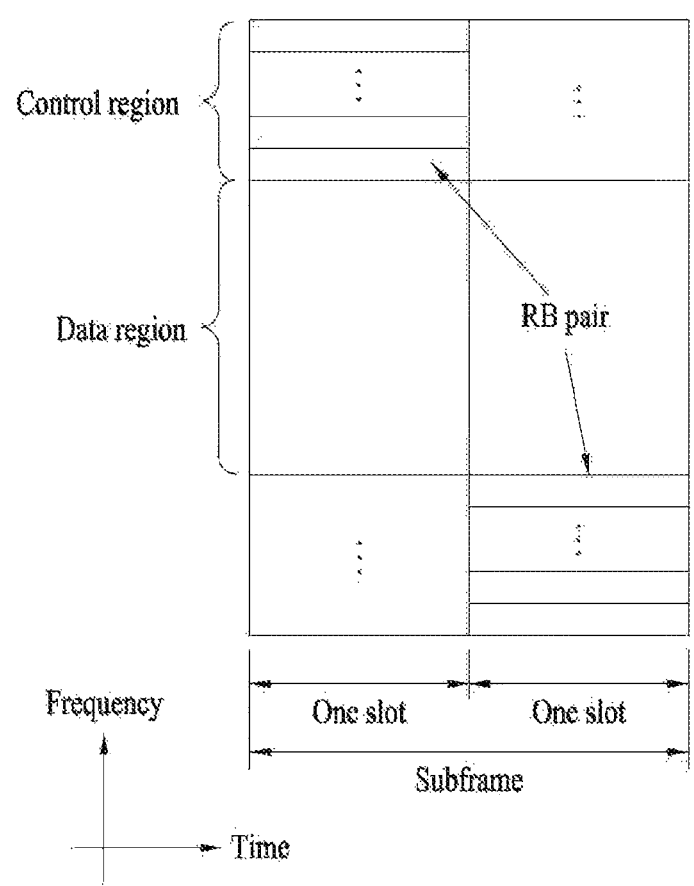
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[equation 2]}$$

Meanwhile, transmit powers can be set different from each other for individual pieces of transmission information $s_1, s_2, \ldots, s_{N_T}$, respectively. If the transmit powers are set to $P_1, P_2, \Lambda, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \quad \text{[Equation 5]}$$

-continued $$\begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
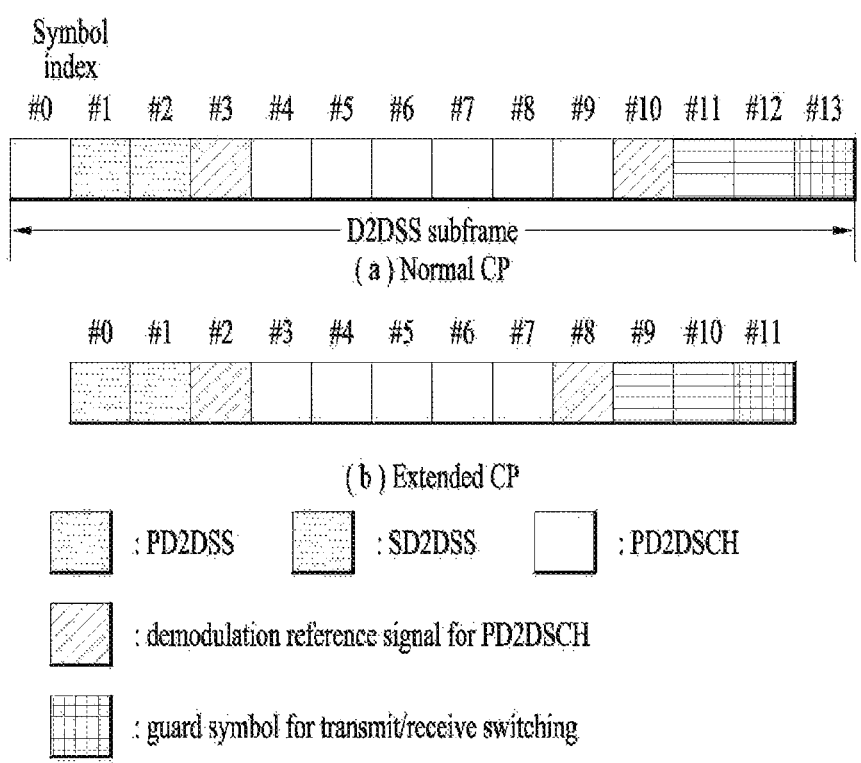
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
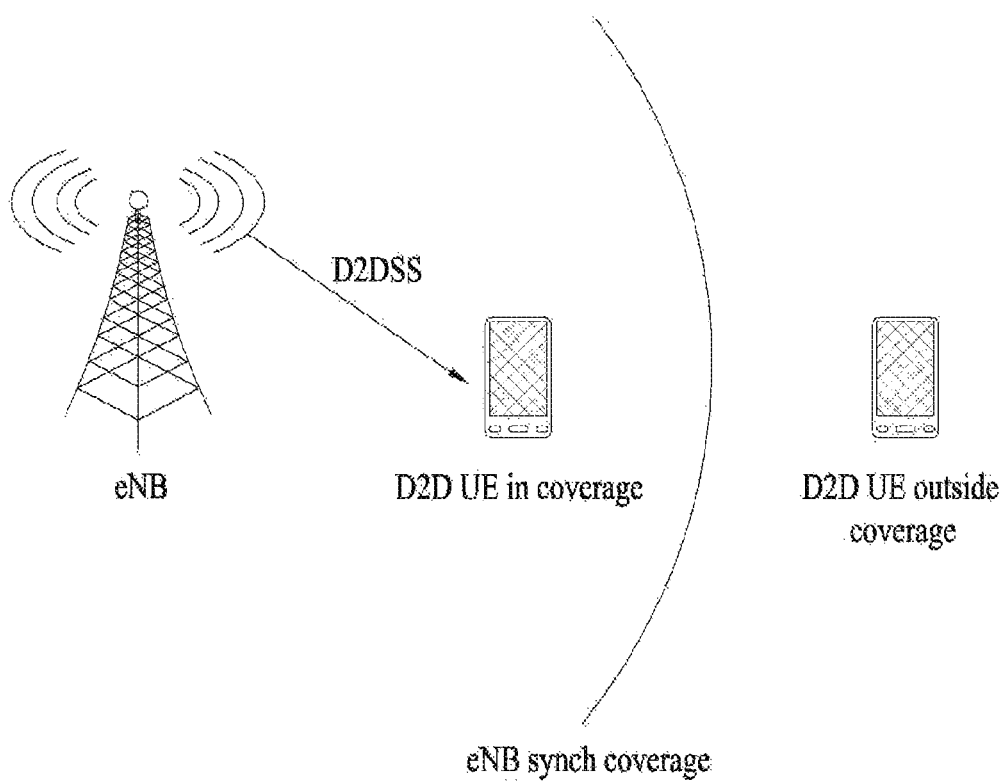
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
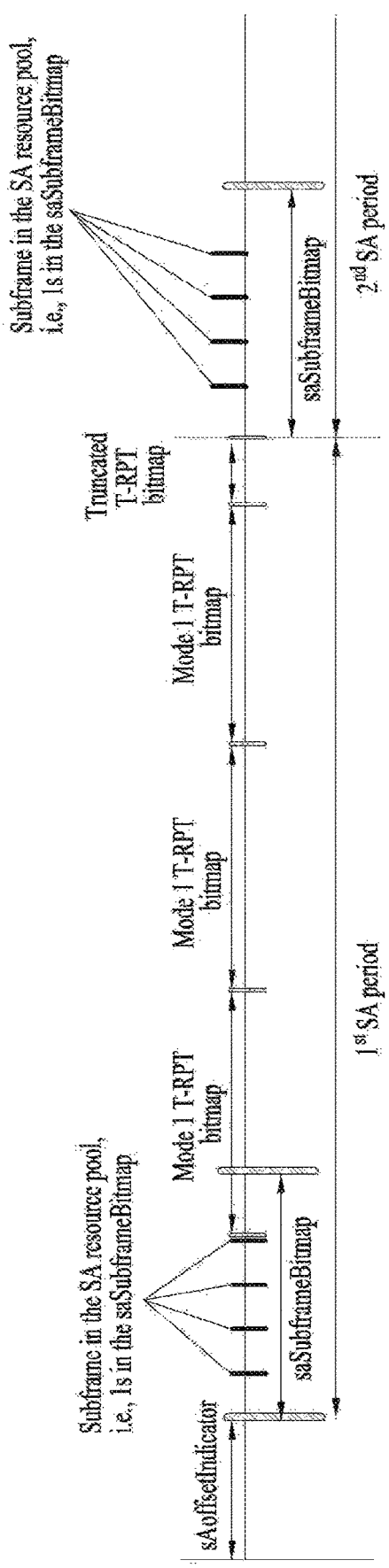
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. A transmission UE performs transmission at a position where a T-RPT bitmap corresponds to 1 in an indicated T-RPT and 4 transmissions are performed in a MAC PDU.

According to legacy 3GPP LTE Rel-12/13 D2D, in order to perform D2D communication, SA is preferentially transmitted and data (data packet) is transmitted later in a data resource region. In this case, if it fails to receive at least one of the SA and the data, a UE is unable to receive information transmitted by a different UE. More specifically, as mentioned earlier in the SA transmission/reception paragraph, a mode-2 UE randomly selects a resource for transmitting SA from among 50 SA resource pools. And, a resource in which data is transmitted is randomly selected as well and the resource is indicated by T-RPT. In this case, since no correlation exists between the SA and the data, it may fail to receive the data while the SA is successfully received. On the contrary, it may fail to receive the SA while the data is successfully received. If there is a correlation between resource selection of SA and resource selection of data, it may be able to solve or mitigate the problem above. In particular, if a correlation of a time resource is set, it is able to solve or mitigate a problem (when UEs different from each other transmit a signal in the same subframe, the UEs are unable to listen to the signal) caused by a half-duplex constraint. In the following, the present invention proposes a method of transmitting SA and data. According to the method, it is able to enhance a reception rate between UEs in D2D (device-to-device) communication or V2V (vehicle-to-vehicle) communication and solve or mitigate a problem caused by a half-duplex constraint. Moreover, it is able to secure wider coverage of control information by reducing the number of bits of the control information and increasing a coding rate of the control information. In the following description, SA may correspond to control information transmitted by a base station or a UE in D2D, V2X, or New RAT.

When SA and Data Re Transmitted Via a Resource Separated on Time Axis

According to one embodiment of the present invention, if SA is transmitted via a resource separated on a time axis, a UE determines subframes in which the SA is to be transmitted in an SA resource pool and can transmit data via a resource indicated by a combination of information on the determined subframes and a time resource indication field. In particular, it may be able to configure a correlation to make all or a part of subframes in which the data is transmitted to be indicated by the information on the subframes in which the SA is transmitted. In this case, the time resource indication field may correspond to a T-RPT (time resource pattern for transmission) field. In the present invention, the T-RPT field corresponds to a field indicating a position of a time resource in which data is transmitted. This field may have a form of a binary bitmap (e.g., 1 indicates a position at which data is transmitted and 0 indicates a position at which data is not transmitted), a form explicitly indicating an offset from the timing at which SA is transmitted, or a form indicating an order for a combination of positions of transmitted time resources. For example, when SA is transmitted and then data is transmitted two times, positions of a firstly transmitted data and a secondly transmitted data can be represented by a bitmap form, an offset form, or a bitmap form indicating a combination of two time resources in the SA. Or, the time resource indication field may correspond to a field indicating a start and/or an end of a subframe in which data are continuously transmitted. In this case, a TTI can be configured in a unit of a time scale (e.g., 0.25 ms) rather than a unit of 1 ms. The information on the subframes in which the SA is transmitted may include a subframe position, an index, and the like. In the following, each of the information is explained in detail.

The information on the subframes may correspond to positions of one or more subframes among the subframes in the SA resource pool. In particular, a subframe position of the SA, which is transmitted in an SA resource pool, is used for indicating all or a part of time resource indication fields of data. All or a part of bits of a position of a time resource (subframe) in which data is transmitted can be indicated using all of a first SA subframe, a second SA subframe, and subframe positions of a first SA and a second SA.

Positions of one or more subframes among the subframes can indicate information corresponding to the first n bits of the T-RPT field. The n can be determined by a size of a resource pool and a position of a first subframe among the subframes.

Figure 10:
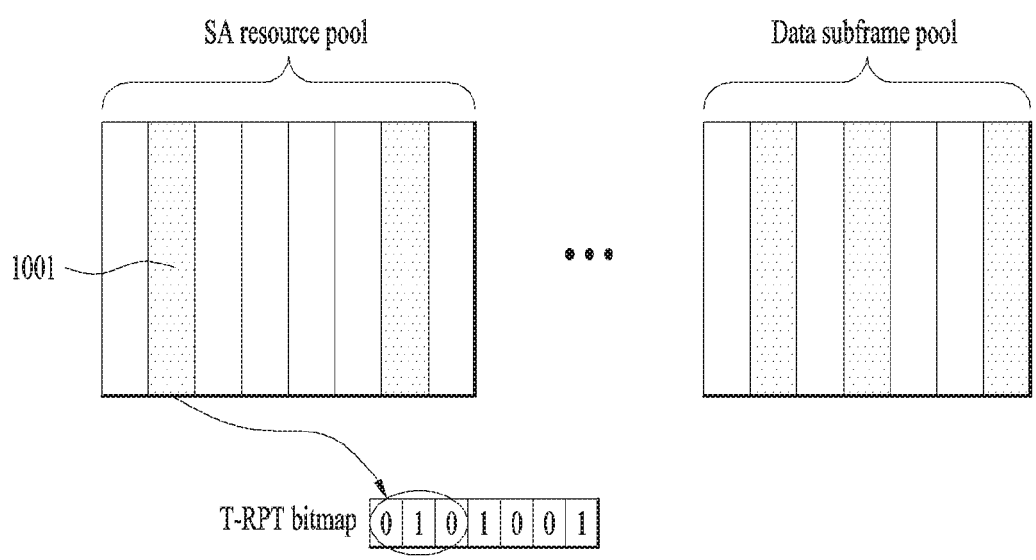
FIG. 10 is a diagram illustrating transmission of control information and data according to an embodiment of the present invention.

For example, as shown in FIG. 10, if an SA resource pool includes 8 subframes, it may be able to represent 3 bits according to a position of a first subframe 1001 (when a pool of SA is configured by 8 subframes, a first SA transmission can be performed in 7 subframes. Since Log2(7)=2.xx is satisfied, it may be able to represent maximum 3 bits. If T-RPT bit overlap is allowed between partial SA resources, it may be able to represent 2 bits.). If the T-RPT bitmap is configured by 7 bits, first 3 bits can be indicated via a subframe position of the SA. (A UE can transmit data by selecting a part corresponding to the remaining 4 bits of the T-RPT bitmap.) The n can be determined by a size of an SA resource pool or positions of a first subframe and a second subframe of the subframes. In particular, it may be able to use a position of a subframe in which first SA is transmitted and a positon of a subframe in which second SA is transmitted together. In the example above, it may be able to generate $_8C_2$=28 combinations in total except the position of the first SA. In particular, it is able to indicate a T-RPT bit map of 4 or 5 bits using a resource subframe position of SA.

As a different example, the information on the subframes may correspond to a resource index in an SA resource pool including one or more subframes among the subframes. In particular, it may provide a correlation between a resource index of SA in the SA resource pool and a subframe position of data. Indexes of one or more subframes among the subframes indicate information corresponding to the first n bits of a T-RPT field. The n is determined by the number of subframe indexes in the SA resource pool and a position of a first subframe among the subframes. For example, when there are maximum 50 SA resource indexes, it is able to represent maximum 5 bits using the SA resource indexes. The maximum 5 bits among the 7 bits of the T-RPT are determined using the SA resource indexes. Since the SA resource indexes are directly used, implementation of the method above can be simplified. And, when the number of subframes of SA is small in the SA resource pool, it may be able to indicate a plurality of T-RPT bitmaps via an SA resource position.

As a further different example, it may be able to indicate (all or a part of a field) of a time resource position of data using a frequency resource position of SA. As mentioned in the foregoing description, if all or a part of bits of a time resource indication field is indicated using a position of a time resource of SA, the remaining bits of the time resource indication field are determined using a position of a frequency resource of the SA. In this case, a time resource position of the data can be determined by a frequency position of a first SA transmission or a frequency position of a second SA transmission in an SA resource pool. Or, the time resource position of the data can be determined by frequency positions of all SA transmissions. In particular, the method of indicating all or a part of the time resource indication field of data using a frequency resource position of the SA and the method of indicating a part of the T-RPT of data using a time resource position of the SA can be used in a combined form.

As mentioned in the foregoing description, if a partial field function of a T-RPT field is replaced with the information on the subframes in which SA is transmitted, the T-RPT field can be configured by three methods described in the following.

As a first method, the first n bits or the last n bits (MSB or LSB) of the T-RPT field can indicate whether or not data is transmitted. In particular, although the partial field function of the T-RPT field is replaced with the information on the subframes in which SA is transmitted, the T-RPT field performs the original function as it is. When all or a part of bits of the time resource indication field of data are indicated using a resource position of the SA, similar to the legacy method, an SA field is signaled to all time resource indication fields via the SA. For example, similar to the legacy SA, T-RPT is explicitly signaled via the SA or a starting point of data can be explicitly signaled in a manner of being included in the SA. According to the present method, a reception UE can perform reception using the time resource indication field included in the SA.

As a second method, the first n bits of the T-RPT field can be used for a virtual CRC (cyclic redundancy check). In particular, since the partial field function of the T-RPT field is replaced with the information on the subframes in which SA is transmitted, the corresponding T-RPT field can be used for a different usage. Or, corresponding bits of the T-RPT field can be fixed by a specific state (e.g., all zero). If a length of the time resource indication field varies according to a position of SA, since the number of blind decoding bits of a reception UE varies according to a size of an SA resource pool, implementation complexity of the UE may increase. In order not to increase the implementation complexity of the reception UE, a size of the time resource indication field is fixed with a specific state to utilize the part as a virtual CRC or a different purpose.

As a third method, if a part of bits of the time resource indication field is indicated by a resource position of SA, the remaining bits of the time resource indication field can be transmitted via the SA. According to the present method, it may be able to reduce a size of information bits included in the SA by reducing a size of the time resource indication field included in the SA, thereby enhancing a coding gain.

Meanwhile, when a transmission resource of a UE is determined by sensing whether or not there is a signal of a different UE and it is necessary to transmit data as soon as possible due to the tight latency requirement, it is preferable to have a method of continuously transmitting data in time domain compared to a method of transmitting data in a subframe position randomly selected from time domain like T-RPT in LTE Rel-12/13. In particular, it may be able to transmit data in an $X^{th}$ subframe (X is an integer equal to or greater than 0) after SA is transmitted. In this case a value of the X can be indicated by a position of a subframe in which the SA is transmitted or a subframe index. (Of course, the value of the X may correspond to a predetermined value, a value differently determined according to a message type, contents, a priority, etc., or a value preconfigured via higher layer signaling.) And, it may be able to designate an end point of data by signaling or differently configuring a starting point of the data, retransmission number (per MAC PDU) and/or the number of transmission occasions (transmission number) in advance (according to a message type or contents of a message).

When SA and Data are Transmitted in the Same Subframe

Although SA and data are transmitted in the same subframe, it may be able to transmit a time resource indication field. In this case, the time resource indication field can be fixed with a specific state or can be used for a different usage. In order to indicate that data is transmitted in a subframe in which SA is transmitted, the time resource indication field can be fixed with a state not used in a legacy time resource indication field. Or, it may add a new state. Having decoded the time resource indication field of the state, a UE can perform data decoding in the subframe.

If SA and data are transmitted in the same subframe, it may not transmit the time resource indication field. This is because, since the subframe itself in which the SA is transmitted corresponds to the subframe in which the data is transmitted, the time resource indication field is not transmitted. By doing so, it is able to increase a coding rate of the SA. Yet, in order to indicate a fact that the data and the SA are transmitted in the same subframe, a CRC of the SA can be masked with a specific state, all or a part of a DMRS sequence, CS, and an OCC are differently configured, or 1-bit indicator is transmitted in a manner of being included in the SA.

When an RA field of SA is configured, it may consider methods described in the following.

It is able to explicitly indicate a frequency resource position of data irrespective of positions of a time and/or a frequency resource of SA. In particular, it is able to explicitly signal information on a frequency position of data irrespective of whether or not SA and data are transmitted in the same subframe.

A partial bit of an RA field can be fixed with a specific state according to positions of a time and/or a frequency resource of SA. The partial bit is fixed with a specific state to be used as a virtual CRC or indicate other information. According to the present method, since a size of the SA is maintained, it may have a merit in that it is able to reduce implementation complexity of a reception UE.

A part of the RA field may not be transmitted according to positions of a time and/or a frequency resource of the SA. For example, if an SA resource position indicates a start point of RA of data and a frequency domain end point of a data resource is signaled to the SA only, it may be able to reduce an information bit size of the SA. (It is able to obtain an effect of increasing a coding gain.)

Meanwhile, although SA and data are not transmitted in the same subframe, a frequency resource position of the data can be determined according to a resource position of the SA. In other word, the frequency resource position of the data can be determined according to a frequency resource position of the SA. Or, an SA resource index in an SA resource pool can be interlocked with the frequency resource position of the data. In this case, although it is able to explicitly signal a frequency position of the data via the SA, it may not signal the frequency resource position of the data to secure a coding gain of the SA. Or, although a frequency resource indication field of the data is signaled to the SA, the frequency resource indication field can be fixed with a specific state or can be used for indicating other information. This is aimed for not increasing blind decoding complexity of a reception UE by making a format of the SA not to be changed according to a resource allocation scheme. This method can be implemented in a manner of being combined with the aforementioned method of indicating a time resource position of data using a (time and/or frequency) resource position of the SA. More generally, an SA resource index in an SA resource pool may have 1:1 relation with a resource position in a data pool. In case of data, since a size of the data is not fixed, SA (time and/or frequency) resource index has 1:1 relation with a first transmission position of the data in the data pool.

The aforementioned proposal can be extensively applied to a case that such a fixed node as an eNB or an RSU preferentially transmits control information in a specific resource region and then transmits data in a resource region for the data like D2D.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 11:
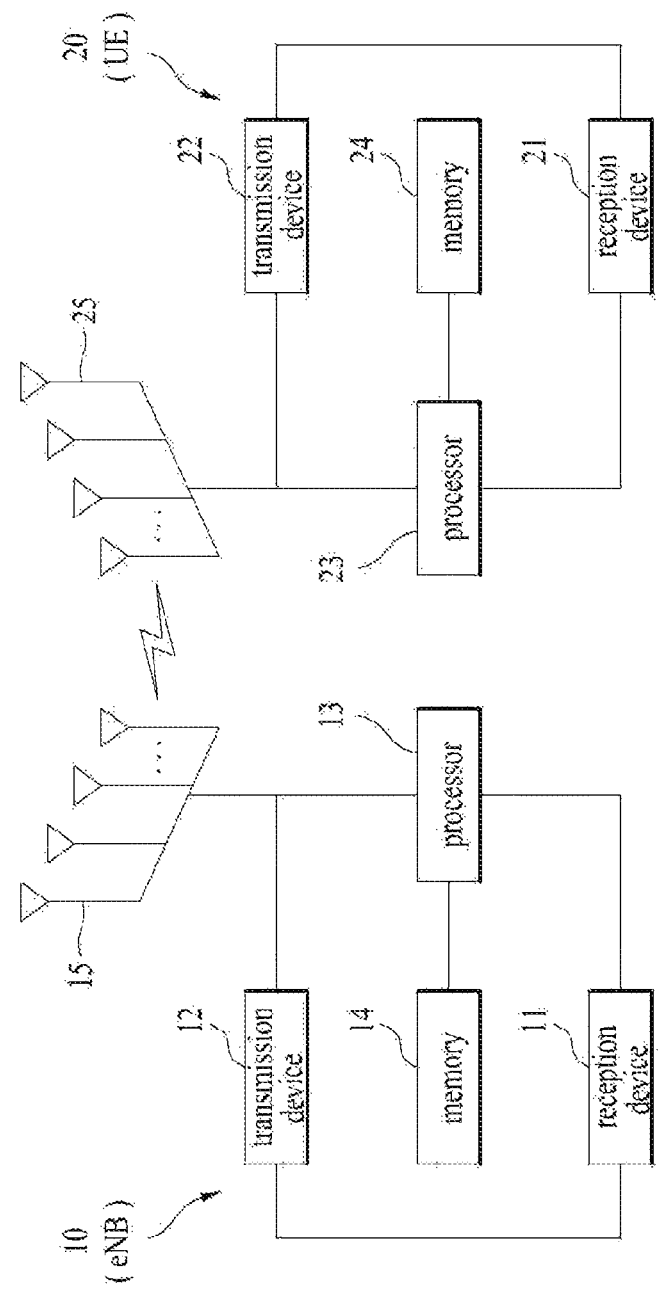
FIG. 11 is a diagram for configurations of a transmitter and a receiver.

FIG. 11 is a diagram for configurations of a transmitter and a receiver.

Referring to FIG. 11, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above. The processor determines subframes in which SA is to be transmitted from an SA resource pool and can transmit data via a resource indicated by a combination of information on the determined subframes and a time resource indication field using the transmit point apparatus. Explanation on the detail operation is replaced with the aforementioned contents.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 11, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 11 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method for a user equipment (UE) in a wireless communication system, the method comprising:
    obtaining a time resource indication field comprising a bit sequence;
    determining a time resource and a frequency resource in which a scheduling assignment (SA) is to be transmitted,
    wherein the time resource and the frequency resource are included in an SA resource pool,
    wherein a time axis position, in the SA resource pool, of the time resource indicates at least one first bit included in the bit sequence, and
    wherein a frequency axis position, in the SA resource pool, of the frequency resource indicates at least one second bit included in the bit sequence;
    transmitting, in the time resource and the frequency resource, the SA comprising remaining bits except the at least one first bit and the at least one second bit; and
    transmitting, in a data time resource correlated with the time resource and the frequency resource, data,
    wherein a time axis position of the data time resource is identified by a bit sequence obtained by a combination of the at least one first bit, the at least one second bit and the remaining bits.

2. The method of claim 1, wherein the time resource indication field is related to a time resource pattern for transmission (T-RPT) field.

3. The method of claim 1, wherein a number of bits of the at least one first bit is determined based on a size of the SA resource pool and a time axis position, in the SA resource pool, of a first subframe included in the time resource with a plurality of subframes.

4. The method of claim 3, wherein the number of bits is determined further based on a time axis position, in the SA resource pool, of a second subframe among the plurality of subframes.

5. The method of claim 1, wherein the time resource for the data is selected from among subframes except the SA resource pool in an SA period based on the correlation between the time resource, the frequency resource and the data time resource.

6. A user equipment (UE) in a wireless communication system, the UE comprising:
    a memory; and
    at least one processor coupled with the memory,
    wherein the at least one processor is configured to:
    obtain a time resource indication field comprising a bit sequence;
    determine a time resource and a frequency resource in which a scheduling assignment (SA) is to be transmitted,
    wherein the time resource and the frequency resource are included in an SA resource pool,
    wherein a time axis position, in the SA resource pool, of the time resource indicates at least one first bit included in the bit sequence, and
    wherein a frequency axis position, in the SA resource pool, of the frequency resource indicates at least one second bit included in the bit sequence;
    transmit, in the time resource and the frequency resource, the SA comprising remaining bits except the at least one first bit and the at least one second bit; and
    transmit, in a data time resource correlated with the time resource and the frequency resource, data,
    wherein a time axis position of the data time resource is identified by a bit sequence obtained by a combination of the at least one first bit, the at least one second bit and the remaining bits.

7. The method of claim 1, wherein SA resources included in the SA resource pool are indexed,
    wherein the time resource and the frequency resource correspond to one SA resource among the SA resources, and
    wherein the time axis position and the frequency axis position are identified based on an index of the one SA resource.

8. A user equipment (UE) in a wireless communication system, the UE comprising:
    a memory; and
    at least one processor coupled with the memory;
    wherein the at least one processor is configured to:
    receive, in a time resource and a frequency resource, a scheduling assignment (SA) comprising remaining bits except at least one first bit and at least one second bit, wherein the time resource and the frequency resource are included in an SA resource pool;
    obtain a time resource indication field comprising a bit sequence obtained by a combination of the at least one first bit, the at least one second bit and the remaining bits,
    wherein the at least one first bit is identified based on a time axis position, in the SA resource pool, of the time resource, and
    wherein the at least one second bit is identified based on a frequency axis position, in the SA resource pool, of the frequency resource; and
    receive, in a data time resource correlated with the time resource and the frequency resource, data,
    wherein a time axis position of the data time resource is identified by the bit sequence.

* * * * *